(12) United States Patent
Lawrence et al.

(10) Patent No.: US 9,399,744 B2
(45) Date of Patent: Jul. 26, 2016

(54) PELLETIZED CARBONIZED BIOMASS, METHODS, AND APPARATUSES

(71) Applicant: Novus Technology, Incorporated, Northport, AL (US)

(72) Inventors: William J. Lawrence, Meridian, MS (US); James Grady Coble, III, Fernandina Beach, FL (US); Jared Ray Phillips, Tuscaloosa, AL (US)

(73) Assignee: Novus Technology, Incorporated, Northport, AL (US)

( * ) Notice: Subject to any disclaimer, the term of this patent is extended or adjusted under 35 U.S.C. 154(b) by 201 days.

(21) Appl. No.: 13/915,431

(22) Filed: Jun. 11, 2013

(65) Prior Publication Data

US 2013/0326940 A1    Dec. 12, 2013

Related U.S. Application Data

(60) Provisional application No. 61/658,369, filed on Jun. 11, 2012, provisional application No. 61/813,069, filed on Apr. 17, 2013.

(51) Int. Cl.
| | | |
|---|---|---|
| *C10L 5/00* | (2006.01) | |
| *C10L 5/44* | (2006.01) | |
| *C10L 5/36* | (2006.01) | |
| *C10L 5/14* | (2006.01) | |
| *C10L 5/30* | (2006.01) | |

(52) U.S. Cl.
CPC . *C10L 5/447* (2013.01); *C10L 5/14* (2013.01); *C10L 5/363* (2013.01); *C10L 5/30* (2013.01); *C10L 2200/0484* (2013.01); *C10L 2290/06* (2013.01); *C10L 2290/08* (2013.01); *C10L 2290/146* (2013.01); *C10L 2290/30* (2013.01); *Y02E 50/10* (2013.01); *Y02E 50/15* (2013.01); *Y02E 50/30* (2013.01)

(58) Field of Classification Search
CPC ........... C10L 5/447; C10L 5/303; C10L 5/14; C10L 2200/0484; C10L 2290/30; Y02E 50/10; Y02E 50/15; Y02E 50/30
See application file for complete search history.

(56) References Cited

U.S. PATENT DOCUMENTS

| | | | |
|---|---|---|---|
| 1,550,034 A | * | 8/1925 | Leuenberger ............ C10L 5/44 44/564 |
| 4,324,561 A | | 4/1982 | Dean et al. |
| 2007/0266623 A1 | | 11/2007 | Paoluccio |
| 2009/0250331 A1 | | 10/2009 | Hopkins et al. |
| 2010/0101141 A1 | | 4/2010 | Shulenberger et al. |
| 2011/0041392 A1 | | 2/2011 | Stromberg et al. |
| 2011/0252698 A1 | | 10/2011 | Camper et al. |
| 2013/0031830 A1 | | 2/2013 | Steele et al. |

FOREIGN PATENT DOCUMENTS

| | | | |
|---|---|---|---|
| DE | 116261 A1 | | 11/1975 |
| DE | 102004048559 | * | 4/2006 |
| DE | 102004048559 A1 | | 4/2006 |
| WO | 2010093310 A1 | | 8/2010 |
| WO | 2011041880 A1 | | 4/2011 |

OTHER PUBLICATIONS

Axel Funke and Felix Ziegler: "Hydrothermal carbonization of biomass: A summary and discussion of chemical mechanisms for process engineering," Biofuels, Bioproducts & Biorefining, vol. 4, No. 2, Mar. 1, 2010, pp. 160-177.
Sevilla M. et al: "Chemical and Structural Properties of Carbonaceous Products Obtained by Hydrothermal Carbonization of Saccharides," Chemistry—A European Journal, vol. 15, No. 16, Apr. 14, 2009, pp. 4195-4203.
International Search Report and Written Opinion for PCT/US2013/045243, mailed Aug. 21, 2013, European Patent Office.

* cited by examiner

*Primary Examiner* — Cephia D Toomer
(74) *Attorney, Agent, or Firm* — Sutherland Asbill & Brennan LLP

(57) ABSTRACT

Pelletized carbonized biomass-based fuel products, methods, and apparatuses are provided. Methods include applying a binder and a first amount of water to at least partially carbonized biomass, applying a second amount of water to the at least partially carbonized biomass, and pelletizing the at least partially carbonized biomass in an inert atmosphere. Apparatuses include a feeder of at least partially carbonized biomass, a binder source and a first water source configured to provide a binder and water to the at least partially carbonized biomass, a second water source downstream of the binder and first water sources, a pelletizer configured to receive and pelletize the at least partially carbonized biomass, and an inert gas source configured to provide inert gas to the pelletizer.

14 Claims, 2 Drawing Sheets

US 9,399,744 B2

PELLETIZED CARBONIZED BIOMASS, METHODS, AND APPARATUSES

CROSS-REFERENCE TO RELATED APPLICATIONS

This application claims the benefit of U.S. Provisional Application No. 61/658,396, filed Jun. 11, 2012, and U.S. Provisional Application No. 61/813,069, filed Apr. 17, 2013, which are incorporated herein by reference in their entirety.

TECHNICAL FIELD

The present invention relates generally to the field of fuel products, and more particularly to pelletized carbonized biomass-based fuel products and methods and apparatuses for producing the same.

BACKGROUND

Biomass-based fuel products are desirable because they provide a renewable energy source and an eco-friendly alternative to coal and other fossil fuels. Processes such as torrefaction are known to produce at least partially carbonized biomass-based fuel products offering increased energy value and improved combustion properties over the raw biomass.

Densification and pelletization processes are known to transform the at least partially carbonized biomass into more useful forms for storage, shipping, and handling. Densification and pelletization processes, however, experience problems. It would therefore be desirable to provide improved methods and apparatuses for producing pelletized, carbonized biomass-based fuel products.

SUMMARY

In one aspect, a method for producing a pelletized fuel product is provided. The method includes pelletizing at least partially carbonized biomass in an inert atmosphere. In one embodiment, a method for producing a pelletized fuel product includes applying a binder to at least partially carbonized biomass, applying a first amount of water to the at least partially carbonized biomass, applying a second amount of water to the at least partially carbonized biomass after applying the binder and the first amount of water, and thereafter pelletizing the at least partially carbonized biomass in an inert atmosphere.

In another aspect, an apparatus for producing a pelletized fuel product is provided. The apparatus includes a feeder of at least partially carbonized biomass, a pelletizer configured to receive and pelletize the at least partially carbonized biomass, and an inert gas source configured to provide inert gas to the pelletizer. In one embodiment, an apparatus for producing a pelletized fuel product includes a feeder of at least partially carbonized biomass, a binder source configured to provide a binder to the at least partially carbonized biomass, a first water source configured to moisten the at least partially carbonized biomass to a moisture content of about 20 percent to about 40 percent by weight, a second water source configured to bring the moisture content of the at least partially carbonized biomass to about 40 percent to about 60 percent by weight, a pelletizer configured to receive and pelletize the at least partially carbonized biomass, and an inert gas source configured to provide inert gas to the pelletizer.

DETAILED DESCRIPTION

Figure 1:
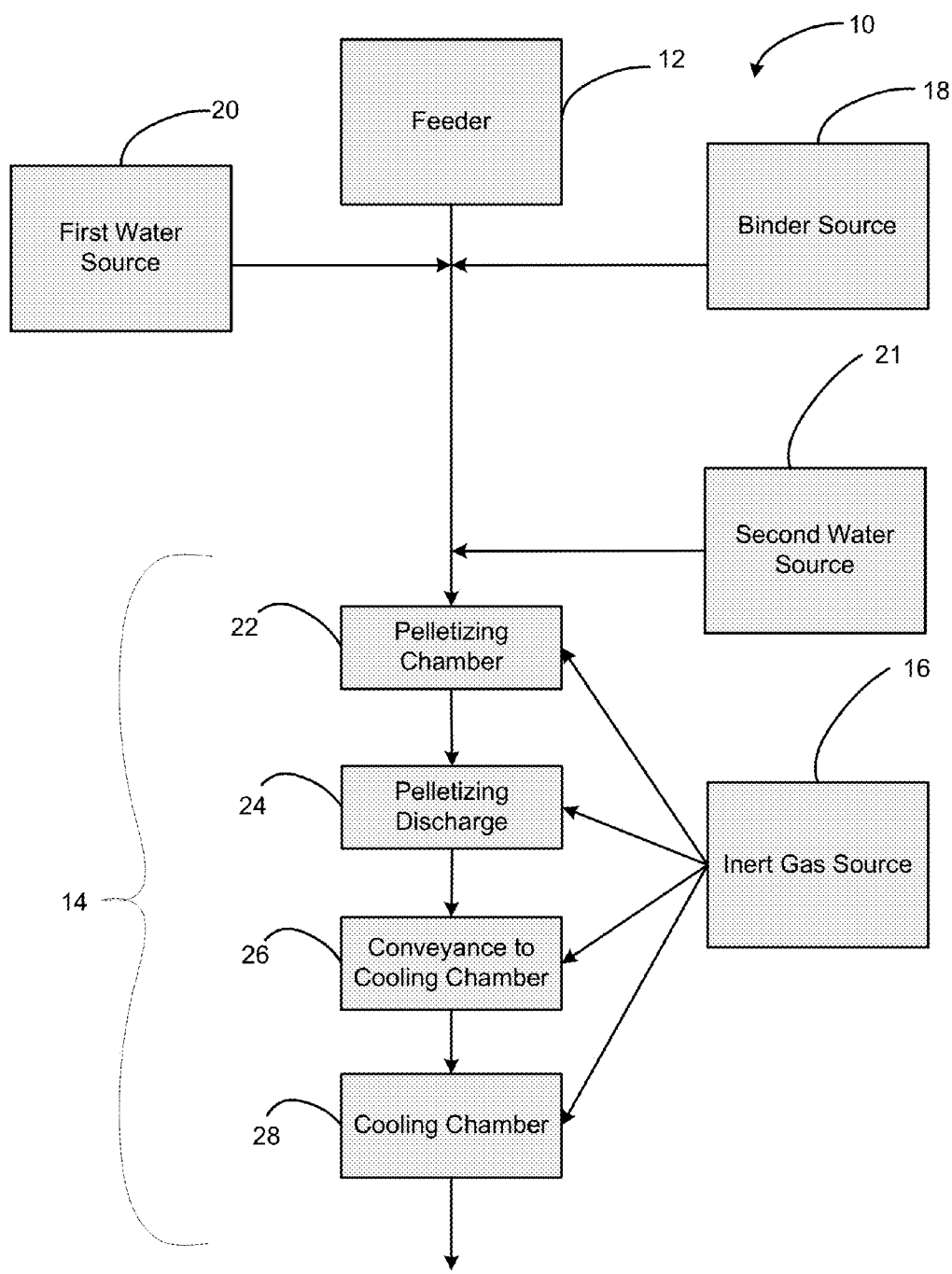
FIG. 1 is a schematic diagram illustrating one embodiment of an apparatus for producing a pelletized fuel product.

The present application will now be described more fully hereinafter with reference to the accompanying drawings, in which several embodiments of the application are shown. Like numbers refer to like elements throughout the drawings.

In the following description, numerous specific details are given to provide a thorough understanding of embodiments. The embodiments can be practiced without one or more specific details, or with other methods, components, materials, and the like. In other instances, well known structures, materials, or operations are not shown or described in detail to avoid obscuring aspects of the embodiments.

Reference throughout the specification to "one embodiment," "an embodiment," or "embodiments" means that a particular feature, structure, or characteristic described in connection with the embodiment is included in at least one embodiment. Thus, the appearances of the phases "in one embodiment" or "in certain embodiments" in various places throughout the specification are not necessarily referring to the same embodiment. Furthermore, the particular features, structures, or characteristics may be combined in any suitable manner in one or more embodiments.

Carbonization processes are known that convert organic substances into carbon or carbon-containing residue. As used herein, the terms "carbonize" and "carbonized" refer to these processes and their products. For example, processes such as torrefaction and hydrothermal carbonization convert raw biomass to at least partially carbonized products having increased mass energy density.

As used herein, the term "biomass" refers to renewable organic materials such as biological materials comprising lignocellulose including hardwood and softwood from trees, wood chips, slash or hog fuel from softwood tree processing, forest residue, straw, chaff, grain, grasses, corn, corn husk, weeds, aquatic plants, and hay, and lignocellulose containing material of biological origin, such as some municipal waste or household waste. Woody biomass is mainly composed of hemicellulose, cellulose, lignin, and small amounts of ash. The structure is a complex arrangement of microfibrils, or bundles of cellulose covered with hemicellulose. Lignin fills the voids between the microfibrils and is sometimes embedded within the amorphous portions of the microfibrils. Each component of the woody biomass displays a unique thermal stability, with hemicellulose decomposing between 225 and 325° C., cellulose decomposing between 305 and 375° C., and lignin decomposing between 250 and 500° C.

Torrefaction refers to the heating of biomass to produce a product having increased mass energy density that can be used as a fuel. Generally, torrefaction may be performed on biomass at temperatures between about 200° C. and about 300° C. After a residence time, the biomass partially decomposes, giving off volatiles such as syngas. Accordingly, torrefaction is commonly performed in the absence of oxygen to prevent ignition of the biomass during torrefaction. The process produces a final product known as "torrefied biomass" or "torrefied wood" when produced from woody biomass. Torrefaction offers a promising biomass upgrading option, as the physical properties of the torrefied solids are similar to those of coal.

During torrefaction, the hemicellulose is the removed to a greater extent than the other components of the biomass. The hemicellulose displays an initial rapid decomposition rate followed by a more lengthy secondary charring with increased holding time. Portions of lignin have been observed to decompose or transform during torrefaction, while cellulose maintains its crystalline structure. The removal of hemicellulose results in a physiochemical transformation of the solid woody biomass material. Elemental analysis of torrefied wood has shown that the fractional makeup of carbon is increased by up to 15-20% while oxygen is reduced by up to 50%. As a result, the atomic ratios of H/C and O/C are reduced from approximately 1.64 to 1.11 and from 0.82 to 0.49, respectively.

The resulting torrefied wood solids offer great promise in renewable combustion opportunities and syngas production due to their increased energy value, friability, and hydrophobic nature. Densification and pelletization of the torrefied solids are desirable to improve ease of handling and storage of the fuel product, i.e., by transforming the product into uniform, high-density pellets; however, these processes experience many problems.

Conventional wisdom suggests that because much of the original hemicellulose is liberated during the torrefaction process, there remains a higher proportion of lignin on a per unit basis of total solid mass than before the reaction occurred. Therefore, adequate amounts of lignin remain to sufficiently bind the solids during pelletization or densification. However, at the reaction temperatures necessary to complete torrefaction, the glass transition temperature of the lignin is altered. In other words, the temperature required to initiate re-bonding of the lignin is increased. The absence of water, considered to be a positive attribute in the torrefaction process, is also believed to play a role in altering the glass transition temperature of the remaining lignin.

In an effort to reach higher temperatures to achieve reactions with the residual lignin to bind the solids, conventional pellet presses would have to be operated at temperatures beyond current technological limits. While several technologies offer promising results for making high temperature pellets, these technologies are tedious, expensive, and presently unavailable for commercialization.

High-temperature operation introduces another serious drawback to pelletization, namely syngas production. As higher temperatures are reached in an effort to initiate lignin reactivity, the previously reacted materials liberate significant amounts of syngas composed of a mixture of carbon monoxide, hydrogen, carbon dioxide, methane, nitrogen, and small amounts of hydrocarbons. This thermo-chemical conversion is further encouraged by the altered friability of the remaining solids, which is now much greater, and by a solids particle size that is quickly reduced to micron size as the solid is introduced to the feed rollers, pellet rams or pellet dies. The resulting product is an ultra-fine particle with a greater surface area than that of the original torrefied solids and consequently is highly pyrophoric. While desirable for the end use of the product, the pyrophoric nature of the product creates a hazard to personnel and equipment during the densification and pelletization process and remains problematic for the successful formation of torrefied pellets.

To avoid the drawbacks associated with high-temperature pelletization, processes that allows for the densification and pelletization of torrefied biomass, hydrothermal carbonized biomass, and other chars without the use of temperatures exceeding the technological limits of conventional pellet presses have been developed. However, it was discovered that low-temperature pelletization utilizing a binder as a substitute for the lignin also involved many challenges and drawbacks. Specifically, it was found that once a pelletization unit reaches temperatures adequate for pellet formation, explosions and hollow core pellets occur, despite operating temperatures well below the flashpoint of torrefied wood. Without intending to be bound by a particular theory, it is believed that fine particles of torrefied wood in the pelletizer emit hydrogen gas and carbon monoxide even at very low temperatures, resulting in highly pyrophoric properties. While considerable teaching exists in the literature regarding the liberation of torrefaction gases, this discovery was surprising.

It was discovered that lower pelletization temperatures combined with an inert environment yield less spontaneous and unintentional combustion reactions during pelletization and result in an improvement in machine uptime and yield. It is believed that this limits the amount of syngas produced during the pelletization process and offers the user an opportunity to operate an array of pelletization equipment in the absence of increased syngas hazards.

To maintain margins of safety with the finished pelletized product, the formation of robust pellets is necessary to reduce the pyrophoric nature of the product. It was found that properly formed pellets or briquettes will significantly reduce the fire hazard by removing the small particle sizes prone to spontaneous combustion. The robustness of the pellet is necessary to maintain this density during storage and transportation. If particle size is allowed degrade to a small fraction in an oxygen rich environment, the risk of unintentional combustion will likely increase due to continued liberation of syngas.

In one aspect, a method is provided for producing a pelletized fuel product, which includes pelletizing at least partially carbonized biomass in an inert atmosphere. In certain embodiments, the at least partially carbonized biomass comprises torrefied wood or hydrothermally carbonized wood. The at least partially carbonized biomass may also include coal and/or char. In one embodiment, the method includes applying a binder to the at least partially carbonized biomass prior to the step of pelletization. The binder may be a starch-based binder or a waterproof binder. For example, the binder may include defatted or full-fatted soybeans. In one embodiment, the binder may be as described in pending U.S. patent application Ser. No. 13/367,138, filed on Feb. 2, 2012 and entitled "Methods For Producing Binders and Combustible Composite Materials and Compositions Produced Therefrom," which is incorporated herein by reference in its entirety.

In certain embodiments, the inert atmosphere includes an inert gas selected from the group consisting of nitrogen, carbon dioxide, and steam. For example, the inert atmosphere may include steam produced from evaporation of water contained in or on the biomass. Evaporation of the water from the biomass may be caused by the high temperature in the pelletizer. Other inert gasses may also be used. The inert atmosphere may be substantially free of excess oxygen.

In one embodiment, the inert atmosphere includes an oxygen displacing fluid. For example, the inert atmosphere may include an oxygen displacing foam or other material that renders the pelletizer substantially oxygen-free. In one embodiment, the inert atmosphere includes a glycerin foam, alone or in combination with an inert gas. Other foams may also be used. For example, an inert gas may be used to foam a foaming material. The foam may aid in capturing the inert gas and maintaining the inert gas with the at least partially carbonized biomass during subsequent processing.

In certain embodiments, the method includes applying water to the at least partially carbonized biomass prior to the step of pelletization. In one embodiment, the method includes applying a first amount of water to the at least partially carbonized biomass prior to the step of pelletization. For example, the first amount of water may be applied to the biomass upstream of the binder, downstream of the binder, or simultaneously with the binder. In one embodiment, the binder and the first amount of water are provided to the biomass together, such as from a single source or a mixer. In certain embodiments, the binder is mixed with water prior to being applied to the biomass, or is provided to the biomass with water other than the first amount of water. For example, the first amount of water may be effective to disperse the binder substantially evenly across the biomass prior to pelletization.

In certain embodiments, the first amount of water is effective to penetrate pores of the at least partially carbonized biomass. For example, the first amount of water may penetrate the pores of torrefied wood biomass, creating a mixture of embedded moisture and binder, to facilitate optimized binding. The embedded water may be evaporated out of the biomass in the pelletization or drying processes.

The first amount of water applied to the biomass may be adjusted based on the type of torrefaction or carbonization reactor that is used to produce the at least partially carbonized biomass. For example, the first amount of water may be used to quench the dry biomass exiting the reactor to prevent self-ignition. In one embodiment, the first amount of water is applied to torrefied wood exiting a torrefaction reactor.

In one embodiment, the first amount of water is effective to give the at least partially carbonized biomass an embedded moisture content of from about 10 percent to about 40 percent, from about 10 percent to about 30 percent, from about 10 percent to about 20 percent, from about 20 percent to about 40 percent, or from about 25 percent to about 40 percent by weight. For example, the first amount of water may be effective to give the at least partially carbonized biomass a moisture content of about 22 percent to about 32 percent by weight.

In certain embodiments, where the at least partially carbonized biomass contains moisture, the step of pelletizing may produce steam from the biomass that acts as at least a portion of the inert gas of the inert atmosphere.

In certain embodiments, the method includes applying a second amount of water to the at least partially carbonized biomass prior to the step of pelletizing. For example, the second amount of water may be applied to the biomass independently from the first amount of water. For example, the second amount of water may be applied downstream of the first amount of water and prior to the pelletization step.

In certain embodiments, the second amount of water is applied to the biomass immediately prior to the biomass being pelletized. For example, the second amount of water may be applied just before the biomass enters the pelletizer. In one embodiment, the second amount of water is applied to the carbonized biomass at a distance upstream of the pelletizer such that the second amount of water is substantially maintained as surface water on the biomass entering the pelletizer.

In certain embodiments, the second amount of water is applied such that a substantial portion of the second amount of water does not penetrate pores of the at least partially carbonized biomass prior to the step of pelletizing. For example, the second amount of water may be applied such that it remains on the surface of the biomass and does not become embedded as the first amount of water. Without being bound by a particular theory, it is believed that the first amount of water may saturate or fill the pores of the biomass such that the second amount of water remains on the surface of the biomass. Also, the timing of the second amount of water being applied immediately before pelletization may not allow the second amount of water to become embedded in the pores of the biomass.

It is believed that the second amount of water operates to reduce the temperature of the pelletizing chamber. This increases productivity of the pelletizer and reduces friction within the pelletizing chamber (e.g., by reducing friction of the pelletizing dies). The second amount of water also reduces dust and the loss of carbonized material from escaping dust.

The second amount of water may also control the moisture content of the carbonized biomass cake to prevent plugging of the pelletizer and other issues. For example, if the biomass cake in the pelletizer is too dry, the resulting pellets are too short and are prone to fracture. If the biomass cake in the pelletizer is too wet, the pelletizer may be too cool and produce in weak pellets. Thus, the second amount of water advantageously allows for additional control of the pelletization process by controlling the consistency of the biomass cake presented to the pelletizer. That is, the second amount of water may be used to trim the process and keep the system function within statistical process control capabilities.

Additionally, at least some of the second amount of water may evaporate within the pelletizer to provide at least a portion of the inert gas. Additional inert gas may or may not be required by the pelletizer.

In one embodiment, the second amount of water is effective to bring a moisture content of the at least partially carbonized biomass to about 25 percent to about 60 percent, from about 25 percent to about 55 percent, from about 40 percent to about 55 percent, or from about 30 percent to about 50 percent by weight. For example, the second amount of water may be provided such that the first amount of water, any additional water applied with the binder, and the second amount of water are collectively present in an amount from about 45 to about 55 percent by weight. In one embodiment, the second amount of water may provide about a 10 percent to about a 40 percent increase in moisture content by weight. That is, about 10 to about 40 percent moisture by weight may be unembedded surface water.

In one embodiment, a method for producing a pelletized fuel product includes: (i) applying a binder to the at least partially carbonized biomass, (ii) applying a first amount of water to the at least partially carbonized biomass, (iii) applying a second amount of water to the at least partially carbonized biomass after applying the binder and the first amount of water, and thereafter (iv) pelletizing the at least partially carbonized biomass in an inert atmosphere. For example, the inert atmosphere may include steam produced from evaporation of the first amount of water and/or the second amount of water.

In certain embodiments, the method also includes applying oil to the at least partially carbonized biomass before or during the pelletizing. For example, the oil may include soybean oil, vegetable oil, canola oil, ethylene glycol, hydrocarbons, or the like.

In certain embodiments, the method also includes at least partially carbonizing a biomass feed to produce the at least partially carbonized biomass. For example, the step of at least partially carbonizing a biomass feed comprises torrefying the biomass feed or hydrothermally carbonizing the biomass feed. For example, the biomass feed may include wood.

In another aspect, an apparatus for producing a pelletized fuel product is provided. As shown in FIG. 1, the apparatus 10 includes a feeder 12 of at least partially carbonized biomass, a pelletizer 14 configured to receive and pelletize the at least partially carbonized biomass, and an inert gas source 16 configured to provide inert gas to the pelletizer 14. In certain embodiments, the at least partially carbonized biomass includes torrefied wood or hydrothermally carbonized wood. In one embodiment, the inert gas includes nitrogen, carbon dioxide, or steam.

In certain embodiments, the pelletizer 14 includes one or more of the following components: a pelletizing chamber 22, a pelletizing discharge 24, a conveyance to cooling chamber 26, and a cooling chamber 28. In one embodiment, the pelletizer at least includes pelletizing chamber 22. The pelletizing chamber 22 may include any known pellet-producing mechanism. For example, the pelletizing chamber may be a small ring die pellet mill, a commercial scale ring die pellet mill, a punch-and-die pellet machine, a pellet press, or the like. For example, the die may be an 8 mm die.

Inert gas source 16 may be configured to provide inert gas to any or all components of pelletizer 14. Separate inert gas sources may also provide inert gas to the individual components of the pelletizer. The inert gas source may also include the moist biomass itself. For example, moist biomass may be provided to the pelletizer and the high temperatures therein may produce steam from the water on or in the biomass.

In one embodiment as shown in FIG. 1, the apparatus 10 includes a first water source 20 configured to moisten the at least partially carbonized biomass to a moisture content of at least about twenty percent prior to pelletization. For example, the first water source 20 may be configured to moisten the at least partially carbonized biomass to a moisture content of about 20 percent to about 40 percent by weight prior to pelletization. In one embodiment, the first water source 20 is configured to moisten the at least partially carbonized biomass to a moisture content of about 22 percent to about 32 percent by weight.

The apparatus 10 also may include a binder source 18 configured to introduce a binder to the at least partially carbonized biomass prior to pelletization. For example, the binder may be introduced to the at least partially carbonized biomass such that the biomass contains binder in an amount from about 0.5 percent to about 15 percent, from about 1 percent to about 10 percent, or from about 2 percent to about 5 percent by weight of the at least partially carbonized biomass. In one embodiment, the biomass may contain binder in an amount of about 2.5 percent by weight of the at least partially carbonized biomass.

The apparatus 10 may also include a second water source 21 configured to further moisten the at least partially carbonized biomass. In one embodiment, the second water source 21 is configured to bring a moisture content of the at least partially carbonized biomass to about 40 percent to about 60 percent by weight. For example, the first water source 20 may bring the moisture content of the biomass to about 20 to about 40 percent by weight, and the second water source 21 may bring the moisture content of the biomass to about 40 to about 60 percent by weight. In one embodiment, the second water source 21 is configured to bring the moisture content of the at least partially carbonized biomass to about 45 percent to about 55 percent by weight.

In certain embodiments, the second water source 21 is configured to apply water to the at least partially carbonized biomass immediately prior to the at least partially carbonized biomass being pelletized by the pelletizer 14. For example, the second water source may be upstream of the pelletizer 14 and downstream of the first water source 20 and/or the binder source 18.

In one embodiment, the binder source 18 and the first water source 20 are configured to provide the binder and the first amount of water to the at least partially carbonized biomass simultaneously. In another embodiment, the first water source is upstream or downstream of the binder source.

In one embodiment, as shown in FIG. 1, an apparatus for producing a pelletized fuel product includes a feeder 12 of at least partially carbonized biomass, a binder source 18 configured to provide a binder to the at least partially carbonized biomass, a first water source 20 configured to moisten the at least partially carbonized biomass to a moisture content of about 20 percent to about 40 percent by weight, a second water source 21 configured to bring the moisture content of the at least partially carbonized biomass to about 40 percent to about 60 percent by weight, a pelletizer 14 configured to receive and pelletize the at least partially carbonized biomass, and an inert gas source 16 configured to provide inert gas to the pelletizer. For example, the inert gas may at least partially include steam produced from the evaporation of moisture from the at least partially carbonized biomass.

Figure 2:
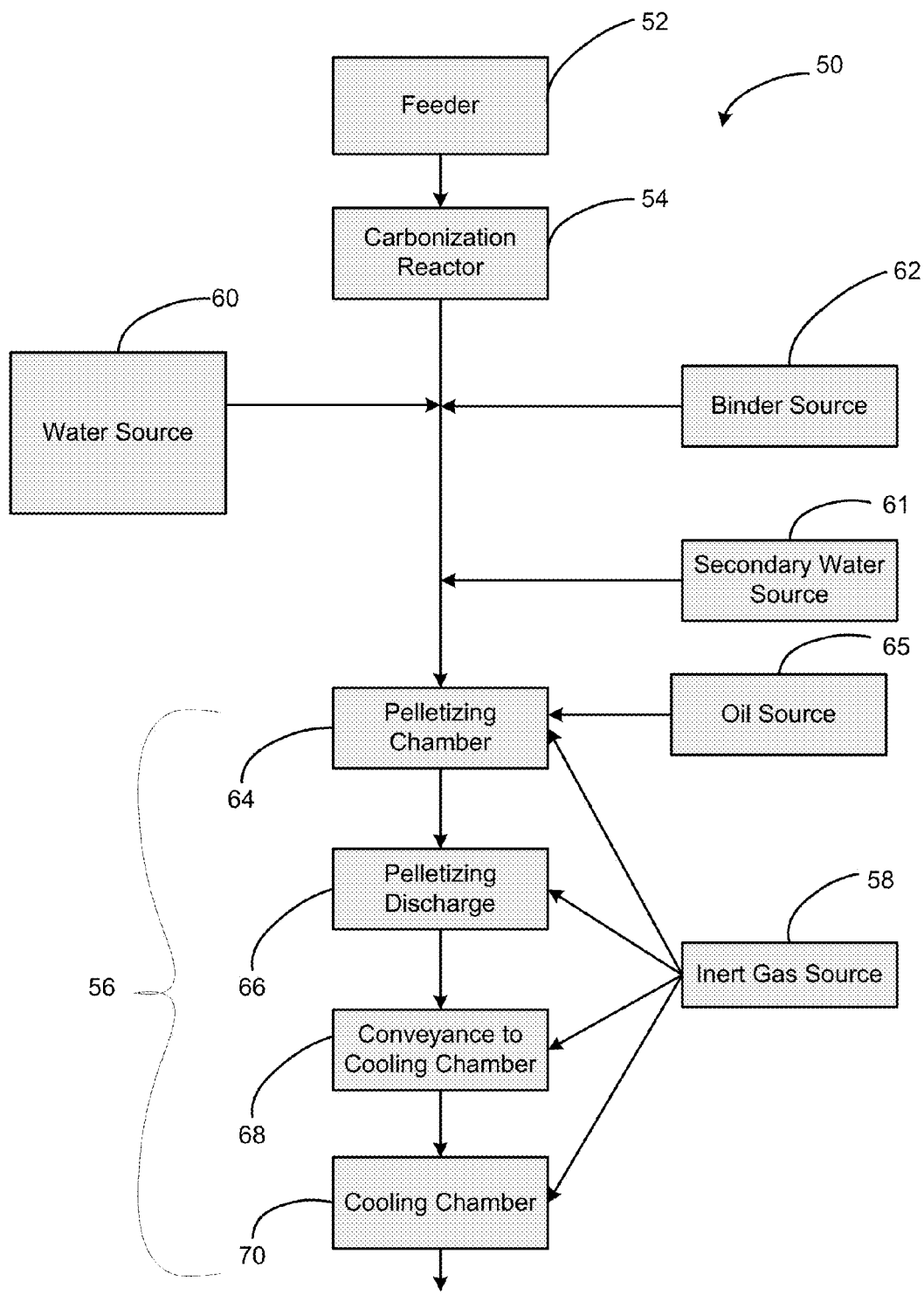
FIG. 2 is a schematic diagram illustrating one embodiment of an apparatus for producing a pelletized carbonized biomass fuel product.

In certain embodiments, as shown in FIG. 2, the apparatus 50 also includes a feeder 52 of raw biomass and a reactor 54 configured to receive and at least partially carbonize the raw biomass. For example, the reactor may be a torrefaction reactor or a hydrothermal carbonization reactor. For example, the raw biomass may include wood.

As shown in FIG. 2, in one embodiment, the apparatus 50 also includes an oil source 65 configured to provide oil to the at least partially carbonized biomass prior to or during pelletizing. The oil may be added to the carbonized biomass feedstock cake in pelletizer when the cake plugs the pelletizer. The oil advantageously unplugs the pelletizer and moves the dry cake plug through the pelletizer to keep the process running. The oil source may provide the oil to the pelletizer or biomass in small bursts. For example, the oil may be provided in an amount of about 1 percent to about 5 percent by weight of the biomass.

The methods and apparatuses of the present disclosure produce torrefied wood pellets at three times the capacity of comparable "dry" torrefied wood systems. For example, commercial scale pelletizing plants disclosed herein may pelletize 4.5 tons per hour of raw wood, while conventional processes produce 1.2-1.3 tons per hour of torrefied wood.

Publications cited herein and the materials for which they are cited are specifically incorporated by reference herein. Modifications and variations of the products, methods, and apparatuses described herein will be obvious to those skilled in the art from the foregoing detailed description. Such modifications and variations are intended to come within the scope of the appended claims.

We claim:

1. A method for producing a pelletized fuel product, comprising:
    applying a first amount of water to at least partially carbonized biomass, the first amount of water being effective to give the at least partially carbonized biomass a moisture content of about 20 percent to about 40 percent by weight;
    applying a second amount of water to the at least partially carbonized biomass after applying the first amount of water, the second amount of water being effective to bring a moisture content of the at least partially carbonized biomass to about 40 percent to about 60 percent by weight; and thereafter
    pelletizing the at least partially carbonized biomass in an inert atmosphere,
    wherein the inert atmosphere comprises steam produced from evaporation of the first amount of water and/or the second amount of water.

2. The method of claim 1, wherein the at least partially carbonized biomass comprises torrefied wood or hydrothermally carbonized wood.

3. The method of claim 1, further comprising:
applying a binder to the at least partially carbonized biomass prior to the step of pelletizing.

4. The method of claim 1, wherein the second amount of water is applied to the at least partially carbonized biomass immediately prior to the step of pelletizing.

5. The method of claim 1, wherein the first amount of water is effective to give the at least partially carbonized biomass a moisture content of about 22 percent to about 32 percent by weight.

6. The method of claim 1, wherein the first amount of water is effective to penetrate pores of the at least partially carbonized biomass.

7. The method of claim 1, wherein the second amount of water is effective to bring a moisture content of the at least partially carbonized biomass to about 45 percent to about 55 percent by weight.

8. The method of claim 1, wherein the second amount of water is applied such that a substantial portion of the second amount of water does not penetrate pores of the at least partially carbonized biomass prior to the step of pelletizing.

9. The method of claim 1, further comprising:
applying oil to the at least partially carbonized biomass before or during the pelletizing.

10. The method of claim 9, wherein the oil comprises soybean oil.

11. A method for producing a pelletized fuel product, comprising:
applying a binder to at least partially carbonized biomass;
applying a first amount of water to the at least partially carbonized biomass;
applying a second amount of water to the at least partially carbonized biomass after applying the binder and the first amount of water; and thereafter
pelletizing the at least partially carbonized biomass in an inert atmosphere
wherein the inert atmosphere comprises steam produced from evaporation of the first amount of water and/or the second amount of water.

12. The method of claim 11, wherein applying the binder and applying the first amount of water occur simultaneously.

13. The method of claim 11, further comprising:
at least partially carbonizing a biomass feed to produce the at least partially carbonized biomass.

14. The method of claim 13, wherein the step of at least partially carbonizing a biomass feed comprises torrefying the biomass feed or hydrothermally carbonizing the biomass feed.

* * * * *